May 17, 1932. P. J. FITZGERALD 1,859,133
HANDLE AND MOTOR ASSEMBLY FOR ELECTRIC UTILITY DEVICES
Filed June 4, 1931
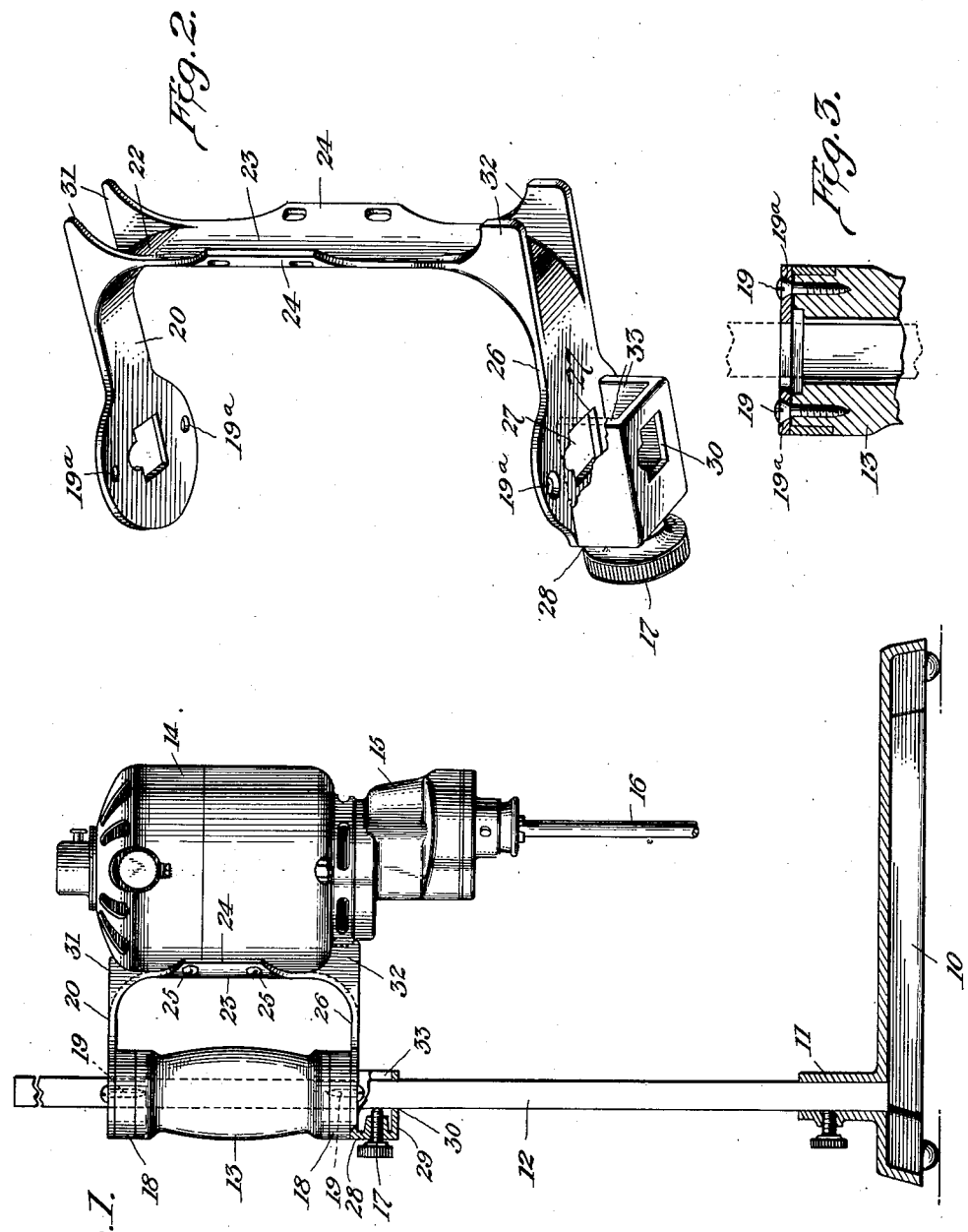
Inventor
Patrick J. Fitzgerald
By
Attorneys Patented May 17, 1932

1,859,133

UNITED STATES PATENT OFFICE

PATRICK J. FITZGERALD, OF TORRINGTON, CONNECTICUT, ASSIGNOR TO THE FITZ-GERALD MANUFACTURING COMPANY, OF TORRINGTON, CONNECTICUT, A CORPORATION OF CONNECTICUT

HANDLE AND MOTOR ASSEMBLY FOR ELECTRIC UTILITY DEVICES

Application filed June 4, 1931. Serial No. 542,187.

This invention relates to an improved motor support for an electric utility device which includes a handle and means for bracing the motor casing.

An illustrative form of construction of the device is represented on the accompanying drawings, in which:

Fig. 1 is a side elevation of the electric utility device.

Fig. 2 is a perspective view of the bracket connecting the handle and the motor casing.

Fig. 3 is a sectional view showing the connection of the upper end of the handle and the bracket.

In the drawings, the base 10 has an upstanding boss 11 to receive the column 12 which passes through the handle 13 to which is connected a bracket for supporting the motor casing 14 which has connected thereto a gear housing 15 and a motor driven tool 16, illustrated as a beater.

It is essential that the motor casing be strongly and firmly supported with respect to the column 12, and to this end the bracket is shown to comprise a single piece of sheet metal which has been bent into a stirrup shape. The upper arm 20 of the bracket is provided with an aperture 21 through which the column 12 may pass. This upper portion 20 is merged by a curve 22 into the vertical portion 23 which is preferably curved in cross section to conform to the motor casing and is provided with the perforated lateral wings 24 by which it may be connected to the motor casing by screws 25, (Fig. 1) and beneath this vertical portion 23, a curved portion 22 passes to the lower arm 26 which likewise has an opening 27 for the column 12. At the end of the arm 26, the sheet metal is bent downwardly to form a portion 28 at right angles to the lower arm 26, and is then bent inwardly again to form a horizontal portion 29 likewise having an aperture 30 for the column 12.

Angle cheek pieces 31 which conform to the shape of the curve portion 22 and to the shape of the motor casing, are connected rigidly to the stirrup bracket either by being formed integrally therewith or by a soldering or welding operation. Similarly, the cheek pieces 32 are provided to conform to the curved portion 22 and to the lower portion of the motor casing and are likewise rigidly connected to the stirrup bracket.

Rectangular cheek pieces 33 similarly join the lower face of the horizontal arm 26 and the upper face of the re-bent portion 29 of the stirrup to provide a housing within which is concealed the inner end of the adjusting screw 17, which passes through the rear wall portion 28 of the stirrup and may engage directly with the column 12 whereby to support the handle and bracket at the desired positional height.

The handle 13 may be provided at its ends with metal ferrules 18 while screws 19 are passed vertically through holes 19a in the horizontal arms 20, 26, to hold the handle against rotational movement about its own axis.

The conformation of the vertical portion 23 of the stirrup bracket and the wings 24 thereof, together with the cheek pieces 31, 32, assure the motor against vibrational movements of any considerable extent and thus hold the motor in position so that its tool 16 does not vibrate back and forth into possible engagement with the sides of the vessel in which the tool 16 is located.

It is obvious that the invention is not limited solely to the form of construction shown, but that it may be employed in many ways within the scope of the appended claims.

I claim:

1. A bracket for an electric utility device having a column and a driving motor, comprising a stirrup-shaped member adapted to be fastened to the motor casing, and a hollow handle secured between the arms of the stirrup and adapted to surround the column, said bracket having cheek pieces rigid with said member conforming to the shape of the ends of the motor casing and extending substantially radially away from the casing when the member is fastened to the casing so that the motor is reinforced against vibrational movement.

2. A bracket for an electric utility device having a column and a driving motor, comprising a stirrup-shaped bracket adapted to be fastened to the motor casing, a hollow handle secured between the arms of the stirrup and adapted to surround the column, and a clamping device on the bracket for securing the same to the column.

3. A bracket for an electric utility device having a vertical column and a motor with a vertical axis, comprising a stirrup-shaped member having two horizontal arms joined by integral curved portions to a vertical portion, the vertical portion being adapted for fastening to the motor casing, and a hollow handle secured between the horizontal arms and adapted to surround the column, and cheek pieces joined to said member at the curved portions thereof and extending in a substantially radial direction with respect to the motor casing and conforming to the ends of the motor casing.

4. A bracket for an electric utility device having a vertical column and a motor with a vertical axis, comprising a stirrup-shaped member having upper and lower horizontal arms and a vertical portion for connecting said arms and adapted to be attached to the motor casing, a hollow handle secured between the arms of the stirrup and adapted to surround the column, said lower arm having an aperture to receive the column and a downwardly and inwardly bent end provided with a second aperture to receive the column, and a clamping screw passing through the downwardly bent part of the end for engaging the column to clamp the end thereto.

In testimony whereof, I affix my signature.

PATRICK J. FITZGERALD.